Sept. 13, 1932.     H. A. SMITH     1,876,776
COTTON PLANTER AND FERTILIZER DEPOSITOR
Filed Nov. 2, 1929     4 Sheets-Sheet 4
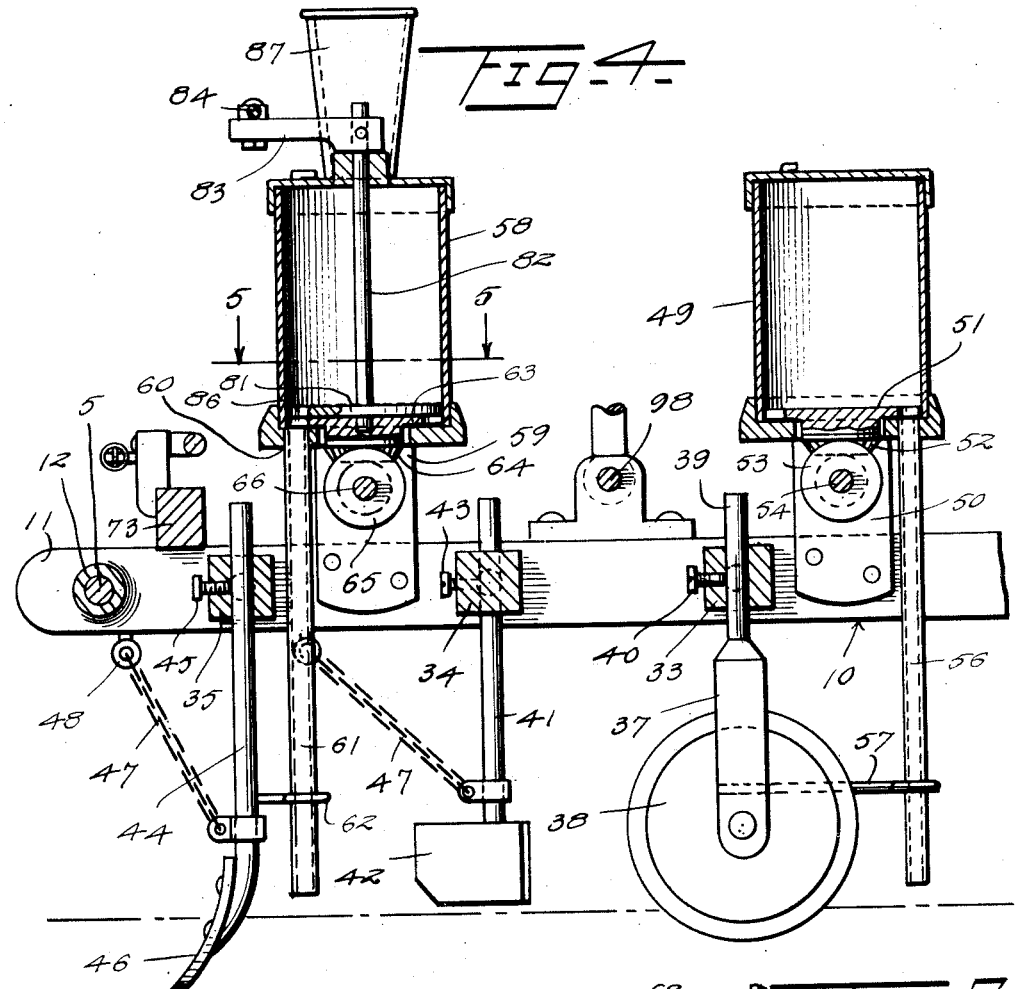
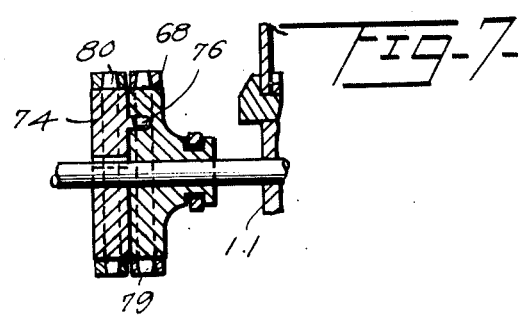
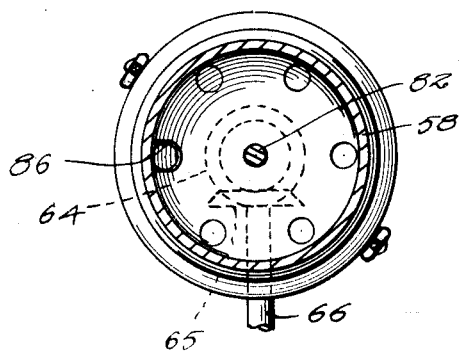
Inventor
H. A. Smith
By Watson E. Coleman
Attorney Patented Sept. 13, 1932

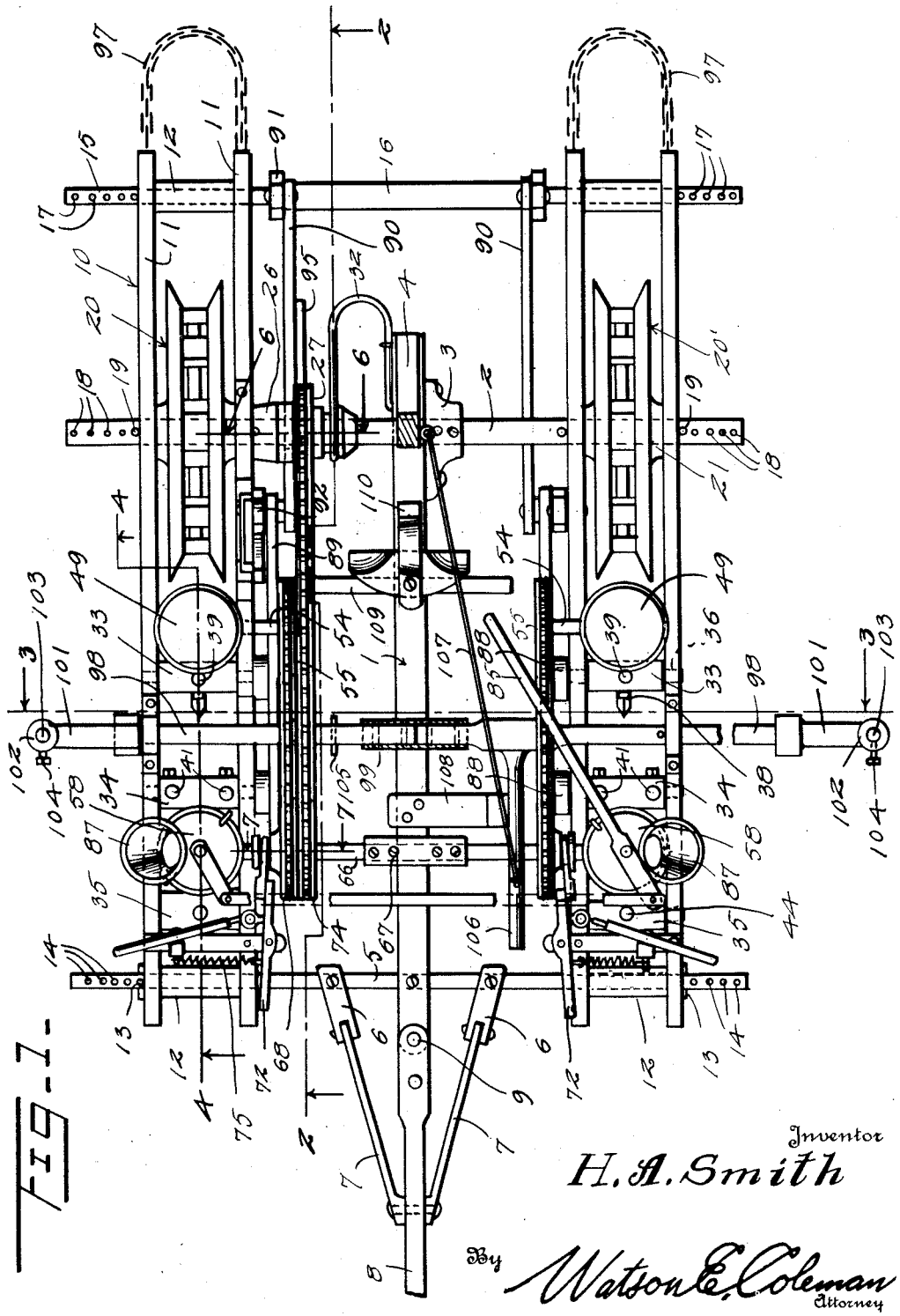

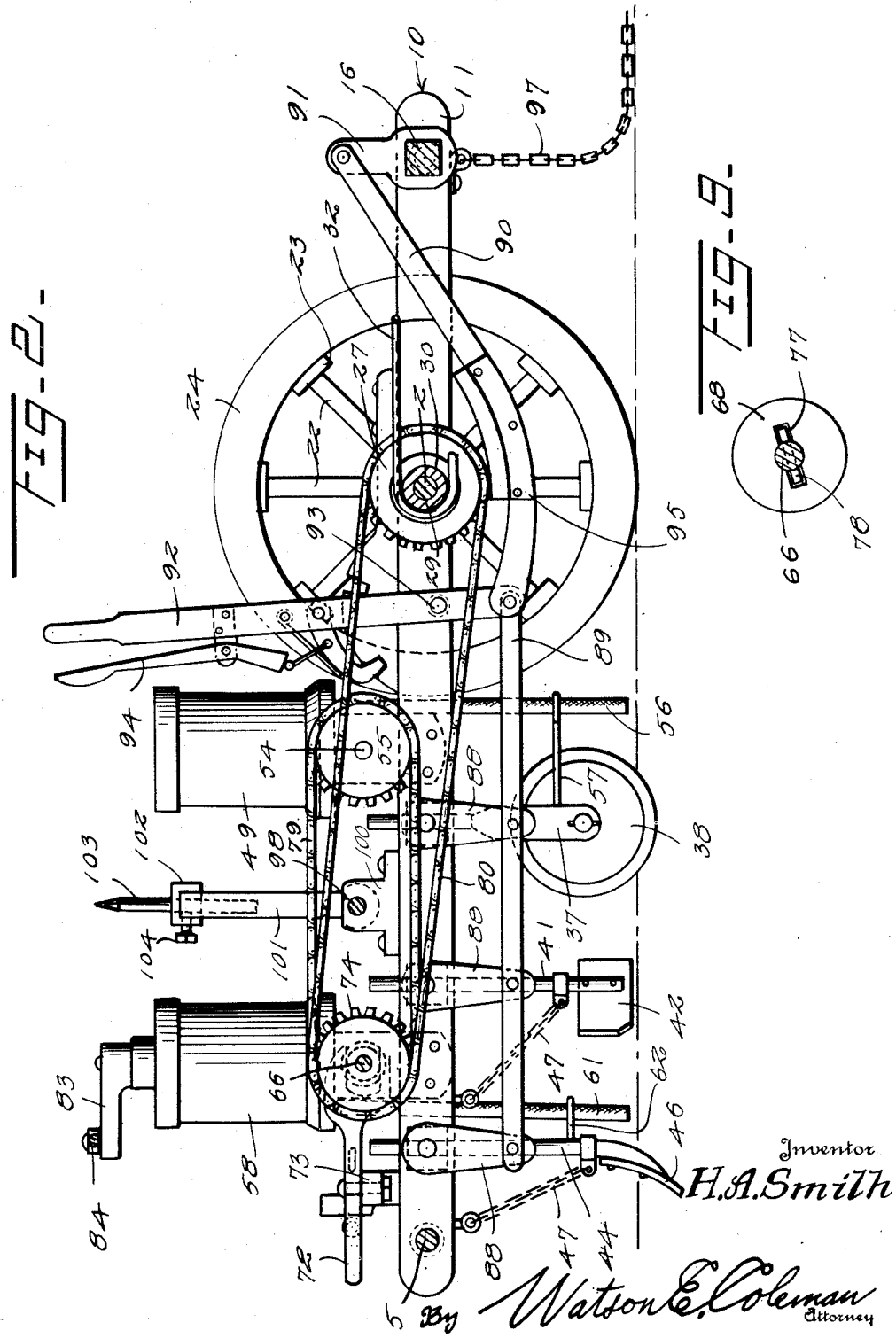

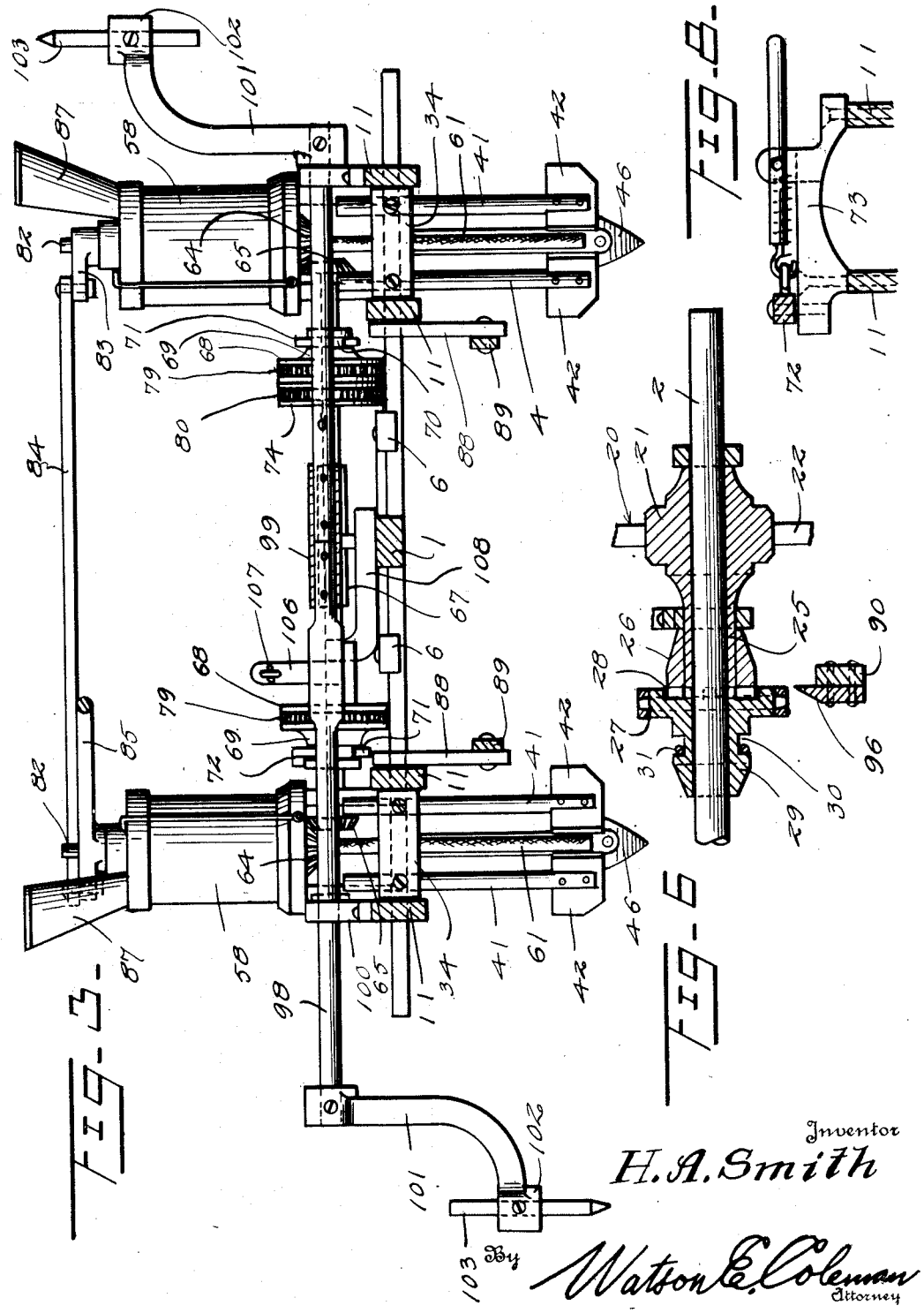

1,876,776

UNITED STATES PATENT OFFICE

HENRY A. SMITH, OF GURLEY, ALABAMA

COTTON PLANTER AND FERTILIZER DEPOSITOR

Application filed November 2, 1929. Serial No. 404,359.

This invention relates to agricultural implements more particularly to planting implements.

The primary object of the present invention is to provide an agricultural implement for planting purposes having associated therewith means for depositing fertilizer in the ground beneath a row of seed.

Another object of the invention is to provide a seed planter designed primarily for planting cotton seed wherein means is provided whereby a deposit of fertilizer may be made and covered over along a path parallel with and beneath the row of seed deposited by a following mechanism which opens a furrow of less depth than the deposited fertilizer and deposits seed therein.

A still further object of the invention is to provide a planting implement of the character above described wherein the discharge of the seed or the fertilizer may be controlled one independently of the other so that a continuation of the fertilizer depositing operation may be carried out without applying seeds or vice versa as desired.

Still another object of the invention is to provide a machine wherein a furrow former, fertilizer depositor, covering sweeps, a second furrow former penetrating to a lesser depth than the first former, a seed depositor and a seed coverer are all arranged in tandem and may be, with the exception of the seed coverer, raised as a unit from working position.

The invention has for a still further object to provide a machine of the above described character wherein two groups of tandem arranged elements are employed to move along parallel lines and wherein such groups may be shifted relative to one another to increase or decrease the distance between the rows planted.

Still another object of the invention is to provide in a mechanism of the above described character means whereby upon the lifting of the elements enumerated certain moving parts of the mechanism will be thrown out of operation so that the discharge of seed and fertilizer will be discontinued.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 shows the structure embodying the present invention in top plan.

Figure 2 is a central longitudinal sectional view of the machine taken upon the line 2—2 of Figure 1.

Figure 3 is a view in transverse section taken upon the line 3—3 of Figure 1.

Figure 4 is a sectional view taken substantially upon the line 4—4 of Figure 1.

Figure 5 is a sectional view taken upon the line 5—5 of Figure 4.

Figure 6 is a sectional view taken upon the line 6—6 of Figure 1.

Figure 7 is a sectional view taken substantially upon the line 7—7 of Figure 1.

Figure 8 is a view in elevation of a holding element for maintaining a clutch in disengaged position, showing the same in such position.

Figure 9 is a view of the face of one sprocket wheel showing the coupling of the same with its shaft.

Referring more particularly to the drawings wherein like numerals of reference indicate corresponding parts throughout the several views, the numeral 1 indicates a central beam of the machine which at its rear end is secured to a fixed axle 2 and is laterally enlarged to provide a platform 3 for an operator of the machine. At this point the beam has mounted thereon an operator's seat, the supporting standard for which is indicated by the numeral 4, the seat having been removed to more clearly show underlying parts of the machine.

Extending transversely of the beam 1 and secured thereto for support thereby, as shown in Figure 1 adjacent its forward end, is a frame beam 5 to which is secured the brackets 6 arranged upon opposite sides of the beam 1 which brackets have pivotally attached thereto the braces 7 which at their forward ends are rigidly secured to a draft tongue 8. As shown the draft tongue 8 extends back between the brace bars 7 and is pivotally attached thereto as indicacted at 9, this attachment being effected by bifurcating the rear end of the tongue and inserting the forward end of the bar 1 between the furcations.

The usual double-tree (not shown) provided in connection with machines of this type where a central tongue is employed may be attached at the point 9. The connection at 9 is sufficiently loose to permit slight vertical movement of the tongue.

Arranged at each side of and substantially parallel with the central beam 1 is an elongated frame structure indicated as a whole by the numeral 10. Each of these frames is made up of a pair of spaced substantially parallel beams 11 which are normally held in the proper spaced relation partly through the medium of sleeves 12 arranged at the front and rear ends. At the front ends of the frames 10 the sleeves 12 are traversed by the cross or transverse beam 5, this beam extending through the beams 11 in the manner shown and maintaining the frame in set position thereon by means of pins 13 passed therethrough. The beam is provided with a series of apertures 14 in any one of which the pins 13 may be placed so as to facilitate widening or narrowing the machine as will be hereinafter more specifically described.

At the rear ends of the frames 10 the sleeves 12 arranged between the beams thereof have extended therethrough the round outer ends 15 of a rear oscillatable beam 16. This beam 16 forms the rear transverse beam of the machine frame and between the frames 10 is of polygonal cross-section. The outer end portions 15 of the beam 16 are provided with the longitudinally extending apertures 17 for the reception of holding pins similar to the pins 13 for maintaining the frames 10 in the proper position.

As is clearly shown in Figure 1 the fixed axle 2 passes through the beams of the frames 10 and the outer ends of the axle are provided with the longitudinally extending series of apertures 18 in which a pin 19 may be engaged for assisting the pins 13 in maintaining the frames 10 in the proper spaced relation.

Mounted upon the axle 2 are the furrow closing wheels 20 and 20' maintained in position thereon by the beams 11 of the adjacent frames 10 between which beams they are positioned. Each of the wheels 20 comprises a hub portion 21 which is of a width substantially equal to the distance between the beams 11 of each frame and radiating spokes 22 the outer ends of which carry cross cleats 23 which maintain in position a pair of spaced annular ground engaging rims 24. The opposed faces of these rims 24 are beveled so that they converge inwardly and will tend to draw together or mound up loose earth over which they pass.

The hub of the furrow closing wheel 20 is provided with an extension in the form of a sleeve shaft 25 which sleeve extends inwardly through the adjacent beam 11 and has fixed thereon a clutch element 26. Slidably mounted upon the axle 2 adjacent the clutch element 26 is a sprocket wheel 27 having formed in the face adjacent the clutch element 26 teeth 28 adapted to be engaged by the teeth of the adjacent clutch element. From the opposite face of this sprocket wheel a hub 29 projects which has a circumferential groove 30 formed therein, in which positions the yoke 31 of a bowed spring 32, this spring having its outer end, that is the end opposite that upon which the yoke 31 is formed, secured to the adjacent beam 1 as shown in Figure 1. From this it will be readily seen that the sprocket 27 is normally held in operative engagement with the clutch member 26 by this spring so that rotary movement of the wheel 20 will be imparted to the sprocket for the purpose hereinafter described.

Arranged forwardly of each of the wheels 20 and 20' is a series of oscillatably supported shafts indicated by the numerals 33, 34 and 35. Each of these shafts as shown is preferably of square cross-section having each end reduced to provide trunnions 36 which extend into the adjacent beams 11 for the support of the shafts.

The shaft 33 in each of the frames 10 carries a vertical arm 37 the lower end of which is bifurcated to receive a furrow forming wheel 38 which wheel, of course, is pivotally mounted between the furcations. The upper end of this arm is of circular cross-section as indicated at 39 and extends through the shaft, being secured thereto in vertical adjusted position by a set screw 40.

Forwardly of each of the furrow forming wheels 38 the shaft 34 supports a pair of depending bars 41 the lower end of each of which carries a sweep 42. The sweeps 42 supported beneath each shaft 34 are arranged in rearwardly converging relation so that as the machine travels forward earth will be swept toward the middle of the pair to be arranged in a mound. These bars 41 like the arm 37 are held in vertically adjusted position by set screws 43.

Forwardly of each pair of sweeps the shaft 35 supports a vertical bar 44 the upper end of which extends therethrough and is held by a set screw 45 while the lower end carries a plow 46, the point of which is located in a plane below the following furrow wheel 38. The plow supporting bars 44 and the bars 41 carrying the sweeps 42 are connected at a point adjacent their lower ends with chains 47 which extend upwardly and forwardly for attachment to the overlying beams as indicated at 48. These chains serve to maintain the bars in the necessary upright position when the machine is moving forwardly.

Directly behind the shafts 33 are placed seed hoppers 49, any suitable means being employed for supporting these hoppers above the adjacent frames 10, such for example as the upright brackets 50 secured to the beams in the manner shown in Figure 4. These seed hoppers may be of any satisfactory type wherein an apertured discharge plate is rotatably mounted in the lower part thereof as indicated at 51 and has a gear such for example as the bevel gear 52 accessible through the lower part of the hopper for coupling with a similar gear 53 which may be mounted upon shafts 54 extending across between the hopper supporting brackets 50. Each of these shafts 54 has mounted thereon inwardly of the adjacent frame 10, a sprocket wheel 55. Leading downwardly from the discharge aperture in the lower part of the seed hopper 49 is a discharge tube 56 the lower end of which is kept directly behind and in alignment with the adjacent furrow forming wheel 38 by a bracket 57 carried by and extending rearwardly of the arm 37 in the manner shown in Figure 4.

Mounted forwardly of each seed hopper 49 just behind the plow carrying shaft 35 is a fertilizer hopper 58. Brackets 59 of the same type as the brackets 50, may be attached to the beams 11 to support the fertilizer hopper in place. The outlet 60 of this hopper has connected thereto a discharge tube 61 which leads downwardly to a point in close proximity to the ground and directly behind the plow 46, this tube being maintained behind the plow in the path of travel thereof by a bracket 62 which is carried by the plow 44. The hopper 58 is provided with the usual rotating apertured disk 63 which feeds the contents of the hopper through the outlet 60 in the usual manner, this disk being provided with a gear 64 which is accessible through the bottom of the hopper for connection with a similar gear 65 carried upon the shaft 66 which extends across the machine and has its ends supported by the brackets 59 in the manner shown.

This shaft 66 is divided substantially midway between its ends and the two portions thus formed are connected by a sleeve 67. By this means the lateral separation of the two frames 10 is permitted without breaking the connection between the operating elements for the fertilizer hopper distributing elements.

The shaft 66 has loosely mounted thereon adjacent each fertilizer hopper a sprocket 68 each of these sprockets having a sleeve extending therefrom and indicated at 69 which is provided with a circumferential groove 70 in which engages a yoke fork 71. Each of the forks 71 is carried by a lever 72 which is mounted for oscillation in a horizontal plane above the adjacent frame 10. A suitable cross support 73 is secured transversely of the beams 11 of each frame 10 to provide the necessary support for these levers.

Mounted upon the shaft 66 upon the side of the machine upon which the sprocket wheel 27 is located, is a fixed sprocket 74. This sprocket normally has the adjacent sprocket 68 forced thereagainst by the lever 72 which is connected therewith, this lever being controlled by a spring 75 which is attached at one end thereto at a point outwardly of the pivotal point thereof while the other end of the spring is attached to a fixed part of the machine. In order to further insure positive engagement of the sprocket 74 with the adjacent sprocket 68 the sprocket 74 may be provided with a pin 76 for engagement in a recess in the face of the adjacent sprocket 68.

At the other end of the shaft 66 the sprocket 68 mounted thereon is provided with a recessed face as indicated at 77 in which is engaged a cross pin 78 when the adjacent lever acting under the control of a spring such as that described in connection with the control of the other lever, forces the sprocket over on the shaft. The sprocket is thus coupled with the shaft to turn therewith for the purpose of transmitting rotary motion through the chain 79 to the sprocket 55 therebehind.

A similar chain 79 couples the other sprocket 68 with the other one of the sprockets 55. The sprocket 74 is connected with the sprocket 27 by the chain 80.

In each of the fertilizer hoppers 58 there is positioned over the material discharging disk 63 a cut-off disk 81 which is carried upon the lower end of an upright shaft 82 which extends through the top of the hopper. Each of the shafts 82 has secured to its upper end an arm 83 and these arms are connected by a connecting bar 84 extending across the machine, one of the arms being extended as indicated at 85 to provide a lever. It will thus be seen that an operator of the machine occupying a seat mounted upon the standard 4 can shut off or start the discharge of the fertilizer from the hoppers 58 at will by simply throwing the lever 85 to oscillate the disks 82 so that the outlet slot 86 which is formed in the periphery of each will be shifted with relation to the outlet opening 60. In order to facilitate the refilling of the fertilizer hoppers 58 without the necessity of removing the tops thereof funnel bodies 87 are provided as shown which open through the tops of the hoppers.

The trunnion 36 at the inner end of each of the shafts 33, 34 and 35 is extended inwardly and has attached thereto a depending arm 88, these arms adjacent each of the frames 10 being connected by bars 89 which are pivotally attached thereto. The rear end of each of the bars 89 has pivotally attached thereto one end of a curved link bar 90, the other end of which terminates over the shaft 16 and has connection with an upstanding crank arm 91 as shown in Figure 2. That bar 89 located adjacent the clutch element 26 and sprocket 27 has pivotally connected therewith the lower end of a control lever 92, this lever being pivotally attached above its point of connection with the bar 89 with the adjacent beam 11 as indicated at 93.

A suitable latch mechanism indicated generally by the numeral 94 is provided in association with the lever 92 to maintain the lever in one of two adjusted positions, the upright position of the lever as shown in Figure 2 arranging the bar 89 and arms 88 so that the earth working elements will be in operative position while movement of the lever toward the rear of the machine will cause both of these bars 89 to be shifted forwardly and to swing the arms 88 up so as to remove the earth working elements from contact with the ground.

The link bar 90 which connects at its forward end with the lever 92 carries a cam plate 95 and when the lever 92 is swung rearwardly to raise the elements 38, 42 and 46 the inclined surface 96 of this cam plate will be forced against the outer edge of the overlying sprocket wheel 27 and will thus shift the same laterally on the axle 2 against the tension of the spring 32 to disengage it from the clutch member 26. The back connection between the sprocket 27 and the sprockets 55 and 68 will thus be broken so that the discharge of the fertilizer and of the seeds being planted will be discontinued immediately upon the raising of the earth working elements.

To the rear of each of the frames 10 a chain loop 97 is attached which drags over the ground after the same has been hilled up by the preceding furrow closing wheel.

Extending transversely of the entire machine between the fertilizer and seed hoppers is a two part shaft 98, the adjacent ends of which are coupled by a sleeve 99. This shaft is mounted in bearings 100 located at the outer sides of the machine and is adapted to be shifted therein transversely of the machine, the shaft being, as shown, of a length substantially greater than the width of the machine.

At each end the shaft carries a substantially arcuate arm 101, the arms being so attached as to extend in opposite directions so that when the free end of one arm is arranged in a plane below the shaft in relatively close proximity to the ground the free end of the other arm will be in an elevated position with respect to the shaft as shown in Figure 3. Each of the arms 101 is formed at its free end to provide a collar 102 through which a marking pin 103 is indicated, the pin being maintained in position by a set screw 104 which is mounted in the collar. Pins 105 are carried by the shaft 98 between the frames 10 which engage the frames when the shaft is shifted to limit its movement and prevent contact of the arms 101 with the machine sides.

Intermediate its ends the shaft 98 carries a lever arm 106 to which a pull cord 107 may be attached so that an operator of the machine may, by means of this cord, pull the lever arm over from a forwardly extending position such as is shown in Figure 1. When the lever arm is extended forwardly in this manner it is held in place by the stop member 108 which is mounted upon the beam 1 and when the lever arm is pulled over to extend toward the rear of the machine with the shaft shifted so as to alter the positions of the markers 103 with respect to the machine, it is supported upon the transverse support 109 and may be secured in this position by swinging the latch 110 to overlie the arm, this latch being pivotally secured as shown to the beam 1. The transverse structure 109 also serves as a foot rest for an operator of the machine.

From the foregoing description it will be readily seen that the relative positions of the frames 10 may be changed as desired to increase or decrease the width of the machine, the frames being slidable upon the axle 2 and the cross beams 5 and 16 and held in adjusted position thereon by the pins associated with the different cross members as previously described.

When the machine is in operation the plows 46 first form a relatively deep furrow into which is discharged fertilizer from the following pipe 61. The sweeps 42 then cover the fertilizer by shifting the plowed up earth back into the furrow and after this operation the wheel 38 following the sweeps passes along over the covered furrow and forms a second furrow which is, however, of less depth than the furrow formed originally by the plow so that the fertilizer remains undisturbed. Seeds are then discharged through the tube 56 into the furrow formed by the wheel and the machine supporting wheels 20 and 20' then pass along over the furrow and cause the earth to be forced back so as to cover the seeds. The chain 97 following the furrow covering or filling wheels then smooths out the mound left by the wheels so that the earth is in proper condition for further cultivation after the plants have developed from the discharged seeds.

During the planting of two rows of seeds the marker shaft 98 is projected laterally of the machine in the desired direction with the marking member 103 at the projected end turned downwardly so as to score the ground along a line parallel with the rows already planted. The operator is then enabled to form a second pair of rows properly spaced from and parallel with the first ones.

Having thus described my invention, what I claim is:—

1. A planting and fertilizer depositing machine of the character described, comprising a central supporting beam for and extending longitudinally of the machine, a transverse supporting beam carried by said longitudinal beam, an axle mounted on and extending transversely of the longitudinal beam, a pair of elongated frames disposed at opposite sides of the longitudinal beam and each comprising a pair of spaced parallel beams, sleeve members disposed between the beams of each frame and maintaining the same in spaced relation, a beam extending transversely of the machine and having its ends extending through certain of said sleeves for oscillation, said transverse beam and said axle having their ends extending through sleeves of the frames, said frames being adjustable on said beams and on said axle relative to said longitudinal beam, elements carried by said frames including material depositing devices having mechanism for depositing predetermined amounts of material, supporting wheels for the machine carried by said axles, means connected with one of said supporting wheels for operating said mechanism, and means operable through the oscillation of said oscillatory beam for effecting the disconnection of the said one of said wheels from the means connected therewith for the operation of the mechanism.

2. In a planting and fertilizer depositing machine of the character described, a pair of frame structures disposed in spaced parallel relation longitudinally of the machine, an axle extending transversely of the structures, earth working elements carried by said structures, material depositing elements carried by the structures and including mechanism operable for discharging predetermined amounts of material therefrom, supporting wheels for the machine mounted on said axle, one of said wheels having a hub formed at one end to provide a clutch jaw, a clutch jaw shiftable on said axle for connection with the first mentioned clutch jaw and rotatable with the axle, means connecting said shiftable clutch jaw with said discharging mechanism for driving the latter, and a cam element reciprocable longitudinally of the machine for effecting the disengagement of said shiftable jaw from the fixed jaw.

3. A planting and fertilizer depositing machine, comprising a central longitudinal support beam, a pair of elongated frames disposed upon opposite sides of said support beam in substantially parallel relation therewith, each of said frames including a pair of spaced parallel beams, an axle disposed transversely of the longitudinal beam and having a frame mounted adjacent each end thereon, a transverse beam carried by said first beam and supporting at its ends the front ends of said frames, a plurality of oscillatable members disposed transversely of each frame, an earth working element carried by each oscillatable member, means carried by said frames adjacent the earth working elements for discharging material onto the ground, and supporting wheels for the machine each being mounted upon the axle and disposed within a frame in alignment with the earth working elements adjacent thereto, each of said wheels being designed to cover a furrow formed by an earth working element.

4. A planting and fertilizer depositing machine, comprising a central longitudinal support beam, a pair of elongated frames disposed upon opposite sides of said support beam in substantially parallel relation therewith, each of said frames including a pair of spaced parallel beams, an axle disposed transversely of the longitudinal beam and having a frame mounted adjacent each end thereon, a transverse beam carried by said first beam and supporting at its ends the front ends of said frames, a plurality of oscillatable members disposed transversely of each frame, an earth working element carried by each oscillatable member, means carried by said frames adjacent the earth working elements for discharging material onto the ground, supporting wheels for the machine each being mounted upon the axle and disposed within a frame in alignment with the earth working elements adjacent thereto, each of said wheels being designed to cover a furrow formed by an earth working element, and means whereby said earth working element carrying members may be simultaneously oscillated to remove the elements from contact with the ground.

5. A planting and fertilizer depositing machine, comprising a central longitudinal support beam, a pair of elongated frames disposed upon opposite sides of said support beam in substantially parallel relation therewith, each of said frames including a pair of spaced parallel beams, an axle disposed transversely of the longitudinal beam and having a frame mounted adjacent each end thereon, a transverse beam carried by said first beam and supporting at its ends the front ends of said frames, a plurality of oscillatable members disposed transversely of each frame, an earth working element carried by each oscillatable member, means carried by said frames adjacent the earth working elements for discharging material onto the ground, supporting wheels for the machine each being mounted upon the axle and disposed within a frame in alignment with the earth working elements adjacent thereto, each of said wheels being designed to cover a furrow formed by an earth working element, an arm carried by each of the oscillatable earth working supporting members, a reciprocable bar connecting said arms, and means whereby upon reciprocation of said bar to shift said elements relative to the ground the discharge of material from said material discharging elements will be suspended.

6. A planting and fertilizer depositing machine, comprising a central longitudinal supporting beam, a pair of elongated frames disposed at opposite sides of said beam and each including a pair of spaced parallel beams, a pair of transverse beams having said frames slidably supported thereon for movement relative to the first mentioned beam, one of said transverse beams being oscillatable, an axle disposed transversely of the first mentioned beam, earth working elements carried by said frames, means carried by said frames for depositing regulated quantities of material on the ground and including mechanism regulating the quantity of material deposited, operating means for said mechanism, a pair of supporting wheels for the machine mounted upon said axle, one of said wheels having a laterally extending hub formed upon its end to provide a clutch element, a clutch element shiftably carried upon said axle for engagement with the first mentioned clutch element, means connecting the last clutch element with said operating means for transmitting power thereto, an elongated cam element extending longitudinally of the machine adjacent said shiftable clutch element, and means connecting said cam element with said oscillatable beam whereby upon oscillation thereof the cam element may be shifted into engagement with the shiftable clutch element to move the same to inoperative position.

In testimony whereof I hereunto affix my signature.

HENRY A. SMITH.